United States Patent
Liu et al.

(10) Patent No.: US 11,938,707 B2
(45) Date of Patent: Mar. 26, 2024

(54) LAMINATING DEVICE AND LAMINATING METHOD OF DISPLAY SUBSTRATE

(71) Applicants: Chengdu BOE Optoelectronics Technology Co., Ltd., Chengdu (CN); BOE Technology Group Co., Ltd., Beijing (CN)

(72) Inventors: Xingguo Liu, Beijing (CN); Qiang Tang, Beijing (CN); Zhihui Wang, Beijing (CN); Wei Qing, Beijing (CN); Ce Wang, Beijing (CN); Shaokui Liu, Beijing (CN); Jia Deng, Beijing (CN); Jialin Wang, Beijing (CN); Zuquan Chen, Beijing (CN); Yuanyuan Chai, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 457 days.

(21) Appl. No.: 17/414,920

(22) PCT Filed: Dec. 30, 2020

(86) PCT No.: PCT/CN2020/141594
§ 371 (c)(1),
(2) Date: Jun. 16, 2021

(87) PCT Pub. No.: WO2021/190054
PCT Pub. Date: Sep. 30, 2021

(65) Prior Publication Data
US 2023/0356518 A1    Nov. 9, 2023

(30) Foreign Application Priority Data
Mar. 24, 2020 (CN) .......................... 202010213106.5

(51) Int. Cl.
*B32B 37/00*    (2006.01)
*B32B 37/10*    (2006.01)
(Continued)

(52) U.S. Cl.
CPC ...... *B32B 37/0053* (2013.01); *B32B 37/0046* (2013.01); *B32B 37/10* (2013.01);
(Continued)

(58) Field of Classification Search
None
See application file for complete search history.

(56) References Cited

U.S. PATENT DOCUMENTS

| 2012/0111479 A1 | 5/2012 | Sung et al. |
| 2014/0345792 A1 | 11/2014 | Lee et al. |

(Continued)

FOREIGN PATENT DOCUMENTS

| CN | 1506218 A | 6/2004 |
| CN | 108693998 A | 10/2018 |

(Continued)

OTHER PUBLICATIONS

CN202010213106.5 first office action.

*Primary Examiner* — Barbara J Musser
(74) *Attorney, Agent, or Firm* — IPro, LLC

(57) ABSTRACT

A laminating device includes: a plate being bendable, having a resilience characteristic and for bearing the flexible substrate; a supporting base platform for supporting the plate and driving the plate and the flexible substrate on the plate to move; a bending assembly for applying stress to drive the plate and the flexible substrate on the plate to be bent towards a side, facing away from the flexible substrate, of the plate, and for releasing stress to allow the plate and the flexible substrate to rebound; and a fixing fixture for fixing the protective cover plate. The protective cover plate is used (Continued)

to be laminated to the flexible substrate, a shape of the fixing fixture is same as or similar to that of the protective cover plate, the fixing fixture is bent to form an accommodating space, and the protective cover plate is fixed in the accommodating space.

20 Claims, 5 Drawing Sheets

(51) Int. Cl.
*B32B 38/00* (2006.01)
*B32B 38/18* (2006.01)
*G02F 1/1333* (2006.01)

(52) U.S. Cl.
CPC ...... *B32B 38/0012* (2013.01); *B32B 38/1866* (2013.01); *G02F 1/133325* (2021.01); *G02F 1/133331* (2021.01); *B32B 2037/1081* (2013.01); *B32B 2038/0028* (2013.01); *B32B 2038/006* (2013.01); *B32B 2457/206* (2013.01)

(56) References Cited

U.S. PATENT DOCUMENTS

| | | | |
|---|---|---|---|
| 2016/0318293 A1 | 11/2016 | Kim et al. | |
| 2020/0009803 A1* | 1/2020 | Kang | B32B 3/04 |
| 2021/0178729 A1* | 6/2021 | Tang | B32B 37/12 |

FOREIGN PATENT DOCUMENTS

| | | |
|---|---|---|
| CN | 108847139 A | 11/2018 |
| CN | 109435409 A | 3/2019 |
| CN | 109435412 A | 3/2019 |
| CN | 109514967 A | 3/2019 |
| CN | 109624297 A | 4/2019 |
| CN | 109664494 A | 4/2019 |
| CN | 110014717 A | 7/2019 |
| CN | 209257633 U | 8/2019 |
| CN | 110211503 A | 9/2019 |
| CN | 110289374 A | 9/2019 |
| CN | 110588132 A | 12/2019 |
| KR | 20140139295 A | 12/2014 |

* cited by examiner

LAMINATING DEVICE AND LAMINATING METHOD OF DISPLAY SUBSTRATE

CROSS-REFERENCE TO RELATED APPLICATIONS

This application is the National Stage of International Application No. PCT/CN2020/141594, filed on Dec. 30, 2020, which claims the priority of the Chinese patent application No. 202010213106.5 filed with the China National Intellectual Property Administration on Mar. 24, 2020, the entire contents of which are incorporated herein by reference.

FIELD

This application relates to the technical field of display, in particular to a laminating device and a laminating method of a display substrate.

BACKGROUND

At present, as display components of electronic devices, OLED flexible display panels have been widely used in various electronic products. With the development of curved screens, the length of the arc region (i.e., the arc length) of an outer glass cover plate of an OLED module is getting larger and larger, which puts forward higher requirements on a method for fully laminating a glass cover plate to a flexible OLED. An existing vacuum laminating technology can only meet the laminating of a glass cover plate, with a small arc length, to a display panel. For the laminating of a glass cover plate, with a large arc length, to the display panel, especially for a 180° inverted laminating manner, there is no corresponding solution.

SUMMARY

The present application discloses a laminating device and a laminating method of a display substrate and aims to improve the laminating yield between a protective cover plate bent in a large radian and a flexible substrate.

A laminating device includes:
a plate, being bendable, having a resilience characteristic, and configured to bear a flexible substrate;
a supporting base platform, configured to support the plate and drive the plate and the flexible substrate located on the plate to move;
a bending assembly, configured to apply stress so as to drive the plate and the flexible substrate located on the plate to be bent towards a side, facing away from the flexible substrate, of the plate, and to release stress so as to allow the plate and the flexible substrate to rebound; and
a fixing fixture, configured to fix a protective cover plate.

The protective cover plate is used to be laminated to the flexible substrate; a shape of the fixing fixture is the same as or similar to that of the protective cover plate; the fixing fixture is bent to form an accommodating space; and the protective cover plate is fixed in the accommodating space.

Optionally, the bending assembly includes:
a bearing membrane, configured to be attached on a surface of a side, facing the plate, of the flexible substrate, be disposed on the plate together with the flexible substrate and drive the flexible substrate and the plate to be bent; and a drive component, configured to be used in cooperation with the bearing membrane, and to drive the bearing membrane to be bent by stretching the bearing membrane.

Optionally, the bearing membrane includes a stretching part exceeding an edge of the flexible substrate.

The drive component includes jig(s) and roller shaft(s), the jig is used to clamp an edge of the stretching part and apply a pulling force to the stretching part, and the roller shaft is used to support the stretching part and change a direction of the pulling force of the stretching part.

Optionally, the bending assembly further includes:
plate resilience assisting rod(s), connected with an edge of the plate, and configured to apply stress so as to drive the plate to be bent and release stress so as to allow the plate to rebound.

Optionally, the plate includes a stainless steel layer and a buffer layer, and a surface of the buffer layer is configured as a bearing surface.

Optionally, the stainless steel layer has a tensile strength of more than 1500 MPa, a hardness of more than 530 HV, and a thickness of 0.1 mm-0.2 mm.

Optionally, the buffer layer is a silica gel material layer, and has a hardness of 20 A-60 A.

Optionally, the stainless steel layer and the buffer layer are compounded and integrated through a silica gel injection molding process.

The supporting base platform is a rigid base platform and welded to the stainless steel layer.

Optionally, the plate is configured to be magnetic.

The fixing fixture is configured to be magnetic and adjustable in magnetism.

Optionally, the fixing fixture includes a base material and a magnetic layer disposed in the base material; and the magnetic layer is configured to be adjustable in magnetism through an electric signal.

Optionally, the protective cover plate includes a main part and two bent parts located at two ends of the main part.

The fixing fixture includes a first part and two second parts located at two ends of the first part; a shape of the first part is the same as or similar to that of the main part of the protective cover plate, and shapes of the two second parts are the same as or similar to those of the two bent parts of the protective cover plate respectively; and the first part is respectively detachably connected with the two second parts.

Optionally, the main part includes a panel region and two ¼ arc bent regions located at two ends of the panel region respectively; and each bent part includes a ¼ arc bent region, and the ¼ arc bent region of each bent part is connected with a respective one of the two ¼ arc bent regions of the main part to form a 180° bend between the main part and the bent part.

A laminating method of a display substrate adopts the laminating device according to any one of the above for laminating, and includes the following operations:
placing a flexible substrate on a plate;
fixing a protective cover plate in an accommodating space formed by a fixing fixture;
applying stress through a bending assembly to drive the plate and the flexible substrate located on the plate to be bent towards a side, facing away from the flexible substrate, of the plate;
driving the plate and the flexible substrate to enter the accommodating space formed by the fixing fixture;

releasing stress through the bending assembly to allow the plate and the flexible substrate to rebound, so as to realize lamination of the flexible substrate and the protective cover plate; and driving the plate to move out of the accommodating space.

Optionally, the plate is configured to be magnetic; and the fixing fixture is configured to be magnetic and adjustable in magnetism.

After the stress is released through the bending assembly to allow the plate and the flexible substrate to rebound, so as to realize the lamination of the flexible substrate and the protective cover plate, the method further includes:

adjusting the magnetism of the fixing fixture to allow the fixing fixture and the plate to be magnetically attracted, so as to realize complete lamination of the flexible substrate and the protective cover plate.

Optionally, applying the stress through the bending assembly to drive the plate and the flexible substrate located on the plate to be bent towards the side, facing away from the flexible substrate, of the plate includes:

a shape of a bent outer side surface of the flexible substrate is coincident with that of a bent inner side surface of the protective cover plate, or a radian of the bent outer side surface of the flexible substrate is larger than a radian of the bent inner side surface of the protective cover plate.

Optionally, the bending assembly includes a bearing membrane and a drive component.

Applying the stress through the bending assembly to drive the plate and the flexible substrate located on the plate to be bent towards the side, facing away from the flexible substrate, of the plate specifically includes:

stretching the bearing membrane through the drive component to bend the bearing membrane, so as to drive the plate and the flexible substrate to be bent along with the bearing membrane.

Releasing the stress through the bending assembly to allow the plate and the flexible substrate to rebound, so as to realize the lamination of the flexible substrate and the protective cover plate includes:

gradually releasing a pulling force through the drive component to allow the plate and the flexible substrate to rebound gradually, so as to realize the lamination of the flexible substrate and the protective cover plate.

Optionally, the bending assembly includes plate resilience assisting rod(s).

Driving the plate to move out of the accommodating space includes:

driving the plate to be bent through the plate resilience assisting rod(s) to pass through an opening of the accommodating space; and driving the plate to move out of the accommodating space from the opening of the accommodating space.

Optionally, the fixing fixture includes a first part and two second parts located at two ends of the first part; and the first part is respectively detachably connected with the two second parts.

Fixing the protective cover plate in the accommodating space formed by the fixing fixture includes:

detaching and separating the two second parts of the fixing fixture from the first part;

matching a main part of the protective cover plate and the first part of the fixing fixture in a contact mode; and covering two bent parts of the protective cover plate with the two second parts of the fixing fixture respectively, and fixedly mounting the two second parts on the first part.

DETAILED DESCRIPTION OF THE EMBODIMENTS

The technical solutions in the embodiments of the present application will be clearly and completely described below in conjunction with the drawings in the embodiments of the present application. It is apparent that the described embodiments are only a part of the embodiments of the present application, rather than all the embodiments. Based on the embodiments of the present application, all other embodiments obtained by those of ordinary skill in the art without involving any inventive effort are within the scope of protection of the present application.

Figure 1:
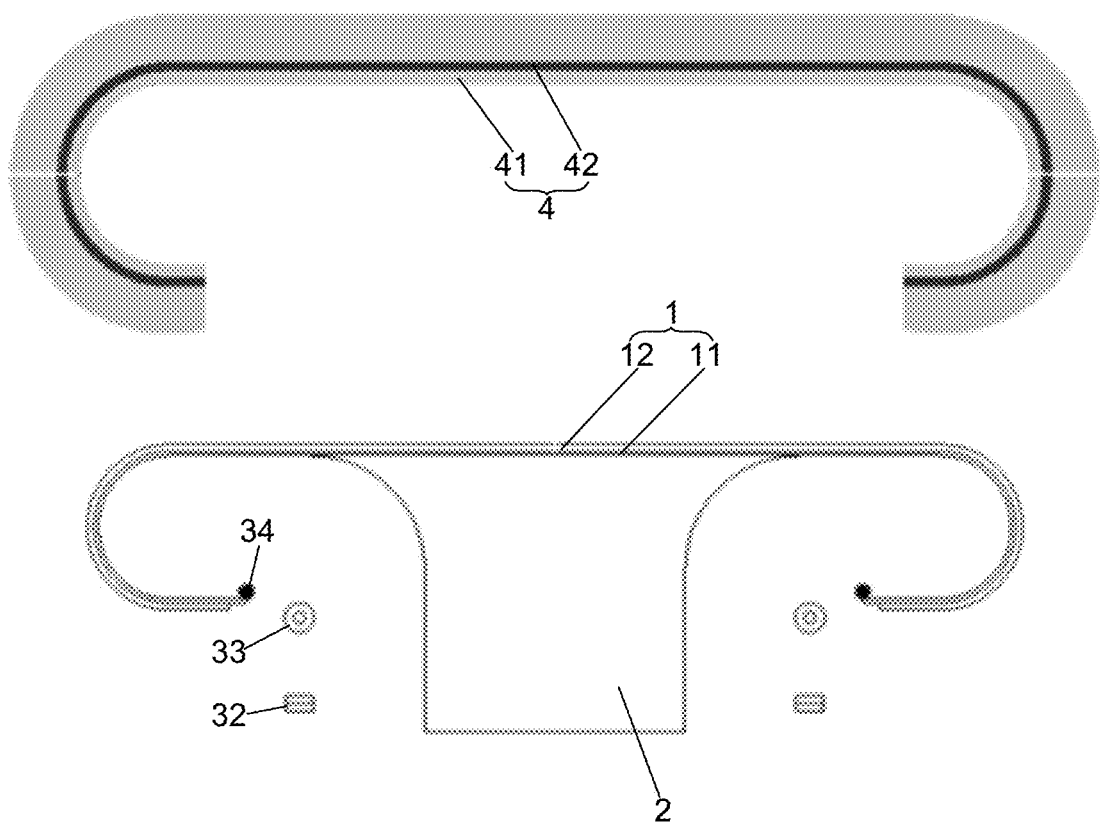
FIG. 1 is a schematic cross-sectional structure diagram of a laminating device provided by an embodiment of the present application.
Figure 2:
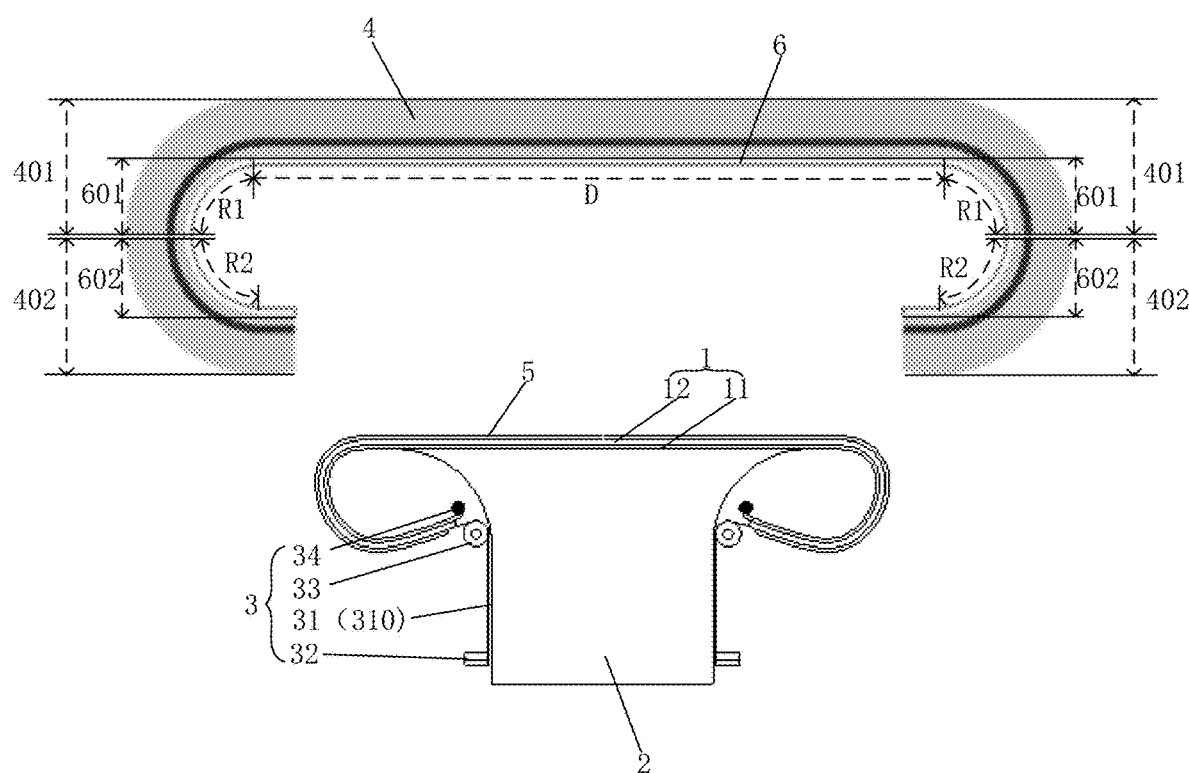
FIG. 2 is a schematic cross-sectional structure diagram of a laminating device provided by an embodiment of the present application after a protective cover plate and a flexible substrate are assembled.

As shown in FIGS. 1 and 2, embodiments of the present application provide a laminating device. The laminating device includes a plate 1, a supporting base platform 2, a bending assembly 3, and a fixing fixture 4.

The plate 1 is bendable, has a resilience characteristic, and is configured to bear a flexible substrate 5.

The supporting base platform 2 is configured to support the plate 1 and drive the plate 1 and the flexible substrate 5 on the plate 1 to move.

The bending assembly 3 is configured to apply stress so as to drive the plate 1 and the flexible substrate 5 on the plate 1 to be bent towards a side, facing away from the flexible substrate 5, of the plate 1, and is configured to release stress so as to allow the plate 1 and the flexible substrate 5 to rebound.

The fixing fixture 4 is configured to fix a protective cover plate 6. The protective cover plate 6 is to be laminated to the flexible substrate 5. A shape of the fixing fixture 4 is the same as or similar to that of the protective cover plate 6. The fixing fixture 4 is bent to form an accommodating space. The protective cover plate 6 is fixed in the accommodating space.

Figure 3A:
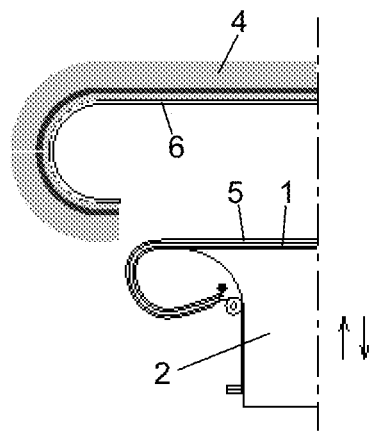
FIG. 3A to FIG. 3G are schematic diagrams of a process of laminating a protective cover plate and a flexible substrate by using a laminating device provided by an embodiment of the present application.
Figure 3B:
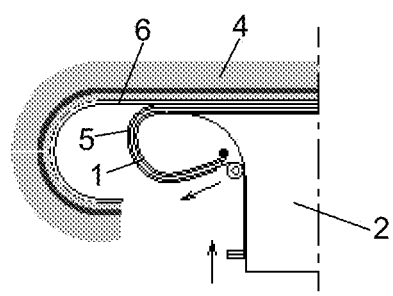
Figure 3C:
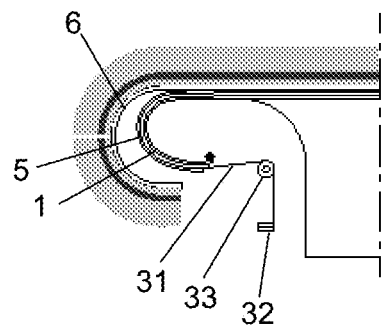
Figure 3D:
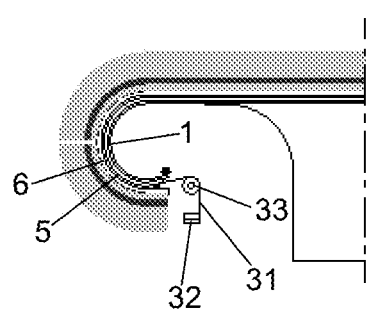
Figure 3E:
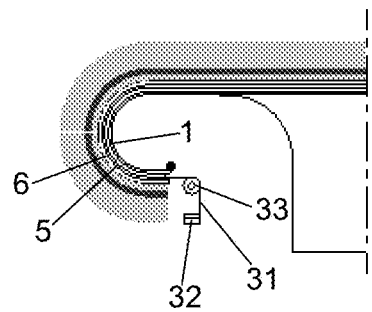

In the above laminating device, the shape of the fixing fixture 4 is the same as or similar to that of the protective cover plate 6, so that the fixing fixture 4 may accommodate and fix the bent protective cover plate 6. The flexible substrate 5 is placed on the plate 1 and may be bent together with the plate 1 under the action of the bending assembly 3, so that a laminating surface of the flexible substrate 5 may match a laminating surface of the bent protective cover plate 6 in shape as much as possible. By bending the plate 1 and the flexible substrate 5, the plate 1 and the flexible substrate 5 may be accommodated in the accommodating space of the fixing fixture 4 for laminating the flexible substrate 5 and the protective cover plate 6. As shown in FIG. 3A and FIG. 3B, the supporting base platform 2 may drive the bent plate 1 and the bent flexible substrate 5 to move into the accommodating space of the fixing fixture 4, and the laminating surface of the bent flexible substrate 5 and the laminating surface of the bent protective cover plate 6 are matched and are close as much as possible. Then, as shown in FIG. 3C to FIG. 3E, the stress is gradually released through the bending assembly 3 to allow the plate 1 and the flexible substrate 5 to rebound gradually, so that under the resilience force of the plate 1 and the flexible substrate 5, the laminating surface of the flexible substrate 5 may be in full contact with and be laminated to the laminating surface of the bent protective cover plate 6.

In summary, on the one hand, the above laminating device may achieve full lamination between the flexible substrate 5 and the large-radian protective cover plate 6, and is especially suitable for 180° inverted lamination of the protective cover plate 6, and a method is simple and practical. On the other hand, the above laminating device gradually releases pre-bending stress with the help of the high resilience and high fatigue strength characteristics of the plate 1 to complete the lamination between the flexible substrate 5 and the protective cover plate 6. The laminating process is controllable, the risk of bubbles and cracks in the laminating process is small, and the laminating yield may be improved.

The protective cover plate 6 may be a glass cover plate.

Adhesive lamination between the flexible substrate 5 and the protective cover plate 6 may be realized through optical clear adhesive (OCA). For example, the laminating surface of the flexible substrate 5 may be coated with the optical clear adhesive before the flexible substrate 5 enters the accommodating space of the fixing fixture 4, and then the flexible substrate 5 may be laminated to the protective cover plate 6 when being in contact with the protective cover plate 6 under the action of a resilience force.

Bending shapes of the flexible substrate 5 and the plate 1 may be coincident with a bending shape of the protective cover plate 6, or may exceed a bending radian of the protective cover plate 6. For example, a shape of a bent outer side surface of the flexible substrate 5 is coincident with that of a bent inner side surface of the protective cover plate 6, or a radian of the bent outer side surface of the flexible substrate 5 is larger than a radian of the bent inner side surface of the protective cover plate 6. Thus, the plate 1 and the flexible substrate 5 may enter the accommodating space of the fixing fixture 4, and the laminating surface of the bent flexible substrate 5 may be advantageously well matched with and laminated to the laminating surface of the bent protective cover plate 6.

Figure 4A:
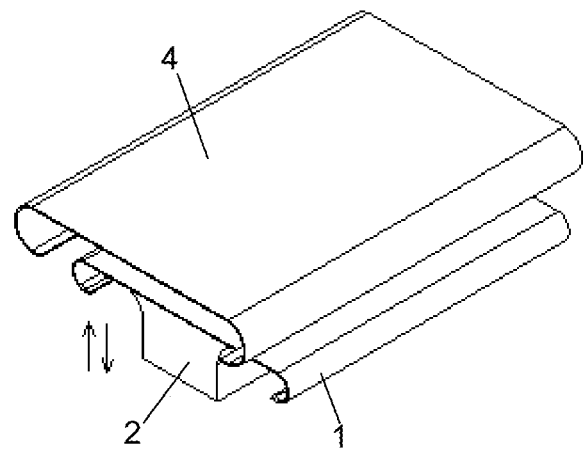
FIG. 4A and FIG. 4B are schematic diagrams of two operation modes for moving a flexible substrate and a plate into an accommodating space of a fixing fixture by using a laminating device provided by an embodiment of the present application.
Figure 4B:
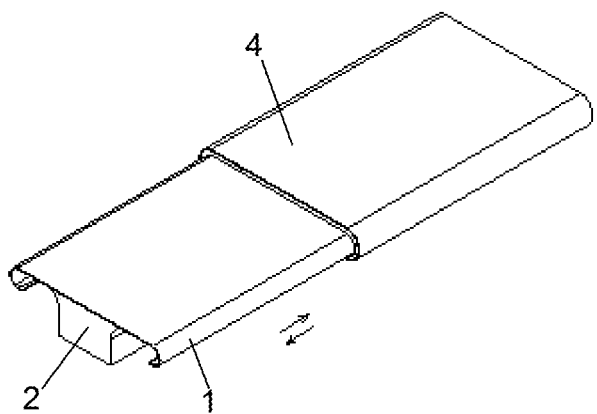

Exemplarily, taking a mode that the protective cover plate and the fixing fixture thereof are inverted with two ends bent by 180° as an example, as shown in FIG. 4A, when the bending shapes of the flexible substrate (not shown) and the plate 1 are coincident with the bending shape of the protective cover plate (not shown), the plate 1 and the flexible substrate may be driven through the supporting base platform 2 to enter the accommodating space from a lower opening of the accommodating space of the fixing fixture 4; or, as shown in FIG. 4B, when the bending shapes of the flexible substrate (not shown) and the plate 1 exceed the bending radian of the protective cover plate (not shown), the plate 1 and the flexible substrate may be driven through the supporting base platform 2 to enter the accommodating space from a side opening of the accommodating space of the fixing fixture 4.

As shown in FIGS. 1 and 2, in some embodiments, the bending assembly 3 may include a bearing membrane 31 and a drive component.

The bearing membrane 31 is configured to be attached on a surface of a side, facing the plate 1, of the flexible substrate 5, namely a surface of a side, facing away from the laminating surface, of the flexible substrate 5, and is used to be disposed on the plate 1 together with the flexible substrate 5 and drive the flexible substrate 5 and the plate 1 to be bent.

The drive component is configured to be used in cooperation with the bearing membrane 31, and to drive the bearing membrane 31 to be bent by stretching the bearing membrane 31.

As shown in FIGS. 1 and 2, in some embodiments, the bearing membrane 31 includes a stretching part 310 exceeding an edge of the flexible substrate 5. The drive component includes jig(s) 32 and roller shaft(s) 33. The jig 32 is used to clamp an edge of the stretching part 310 and apply a pulling force to the stretching part 310, and the roller shaft 33 is used to support the stretching part 310 and change a direction of the pulling force of the stretching part 310.

Exemplarily, an extension direction of the roller shaft 33 is coincident with an extension direction of the edge of the stretching part 310, and the roller shaft 33 may be fixed on the supporting base platform 2. The jig 32 has a certain width along the extension direction of the edge of the stretching part 310, and may be clamped to a relatively wide section of the edge of the stretching part 310 in the extension direction of the edge, thereby achieving uniform distribution of the pulling force acting on the stretching part 310 and achieving a good acting effect. The drive component may further include a servo motor which may be in transmission connection with the jig(s) 32 to drive the jig(s) 32 to stretch the edge of the stretching part 310 of the bearing membrane 31.

As shown in FIG. 2, with an orientation in FIG. 2 as an example, the bearing membrane 31 is attached to one side of the flexible substrate 5 and placed on the plate 1 together with the flexible substrate 5. The stretching part 310 of the bearing membrane 31 may bypass the roller shaft 33 to extend downwards. The jig 32 clamps the edge of the stretching part 310 and may be connected with the servo motor. The jig 32 is driven through the servo motor to stretch the edge of the stretching part 310. The bearing membrane 31 may be bent and drive the flexible substrate 5 and the plate 1 to be bent under the action of the pulling force.

Exemplarily, as shown in FIG. 2, the protective cover plate 6 includes a main part 601 and two bent parts 602 located at two ends of the main part 601. Two ends, used to be laminated to the two bent parts 602 of the protective cover plate 6, in the flexible substrate 5 may be bent through the bending assembly 3. The bearing membrane 31 may include two stretching parts 310, and the two stretching parts 310 are close to the two ends of the flexible substrate 5 respectively. The bending assembly 3 may include two sets of drive components (the roller shafts 33 and the jigs 32). The two sets of drive components are located on two sides of the bearing membrane 31 respectively and used to stretch the two stretching parts 310 on the two sides of the bearing membrane 31. The two ends of the flexible substrate 5 may be bent under the action of a pulling force of the two stretching parts 310 on the two sides of the bearing membrane 31, so as to match the two bent parts 602 of the protective cover plate 6.

As shown in FIGS. 1 and 2, in some embodiments, the bending assembly 3 may further include plate resilience assisting rod(s) 34. The plate resilience assisting rod 34 is connected with an edge of the plate 1, and configured to apply stress so as to drive the plate 1 to be bent and release stress so as to allow the plate 1 to rebound.

Figure 3F:
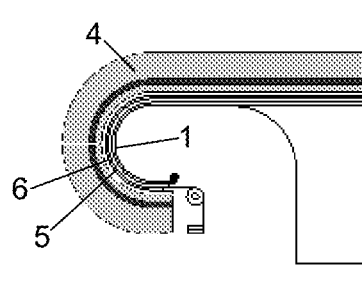
Figure 3G:
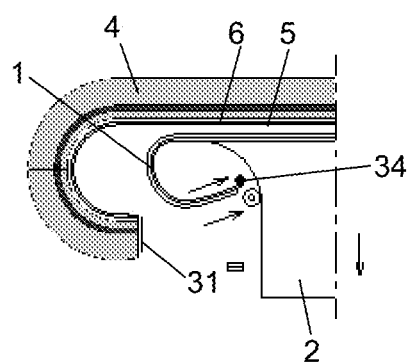

As shown FIG. 3G, after the lamination operation of the flexible substrate 5 and the protective cover plate 6 is completed, the plate 1 needs to be driven to move out of the accommodating space of the fixing fixture 4. The plate 1 may be driven to be bent through the plate resilience assisting rod(s) 34, so as to pass through an opening of the accommodating space; and then the plate 1 is driven through the supporting base platform 2 to move, so as to be separated from the bearing membrane 31 and move out of the accommodating space from the opening of the accommodating space.

As shown in FIG. 3G, after the lamination operation of the flexible substrate 5 and the protective cover plate 6 is completed, the bearing membrane 31 may be peeled off the flexible substrate 5. Exemplarily, a side, in contact with the flexible substrate 5, of the bearing membrane 31 may adopt UV visbreaking adhesive, the viscidity of the visbreaking adhesive may be greatly reduced through ultraviolet irradiation, and thus the bearing membrane 31 may be peeled off the flexible substrate 5 quite easily.

As shown in FIGS. 1 and 2, in some embodiments, the plate 1 includes s a stainless steel layer 11 and a buffer layer 12, and a surface of the buffer layer 12 is configured as a bearing surface.

The stainless steel layer 11 has characteristics of high strength, high fatigue strength and high resilience. Exemplarily, the stainless steel layer 11 has a tensile strength of more than 1500 MPa, a hardness of more than 530 HV, and a thickness of 0.1 mm-0.2 mm.

The buffer layer 12 may be a silica gel material layer, and may have a hardness of 20 A-60 A.

Exemplarily, the stainless steel layer 11 and the buffer layer 12 may be compounded and integrated through a silica gel injection molding process.

Further, the supporting base platform 2 is a rigid base platform and may be welded to the stainless steel layer 11.

Exemplarily, the supporting base platform 2 may be powered through a hydraulic column to realize up-down translation. Alternatively, the supporting base platform 2 may also realize left-right translation, and a specific drive mode is not limited.

As shown in FIGS. 1 and 2, in some embodiments, the plate 1 may be configured to be magnetic. Further, the fixing fixture 4 is also configured to be magnetic and adjustable in magnetism.

After the flexible substrate 5 is in contact with and laminated to the protective cover plate 6 under the action of a resilience force, the magnetism of the fixing fixture 4 may be adjusted so that the fixing fixture 4 and the plate 1 may be magnetically attracted, and an attraction pressure of the fixing fixture 4 and the plate 1 is kept for a certain period of time, thereby realizing further lamination of the flexible substrate 5 and the protective cover plate 6. Since the plate 1 and the fixing fixture 4 have the attraction pressure at all locations and the attraction pressure is controllable, the laminating yield of locations between the flexible substrate 5 and the protective cover plate 6 may be effectively improved, especially in a bending region, laminating bubbles, cracks, etc. are avoided, and thus the quality of a laminated display product, especially a large-radian (180° for example) laminated display product is effectively improved.

Exemplarily, as shown in FIG. 1, the fixing fixture 4 may include a base material 41 and a magnetic layer 42 disposed in the base material 41. The magnetic layer 42 is configured to be adjustable in magnetism through an electric signal.

Exemplarily, as shown in FIG. 2, the protective cover plate 6 includes a main part 601 and two bent parts 602 located at two ends of the main part 601. The fixing fixture 4 includes a first part 401 and two second parts 402 located at two ends of the first part 401. A shape of the first part 401 is the same as or similar to that of the main part 601 of the protective cover plate 6, and shapes of the two second parts 402 are the same as or similar to those of the two bent parts 602 of the protective cover plate 6. The first part 401 of the fixing fixture 4 is respectively detachably connected with the two second parts 402.

Since the shape of the fixing fixture 4 is coincident with that of the protective cover plate 6, a good fixing effect for the protective cover plate 6 may be realized, the protective cover plate 6 may further be supported so as not to be broken under the pressure in the laminating process. By setting the fixing fixture 4 into three detachable parts, namely the first part 401 and the two second parts 402 located at the two ends of the first part 401, the protective cover plate 6 may be placed in the accommodating space of the fixing fixture 4 conveniently, and the protective cover plate 6 may be fixed.

Exemplarily, as shown in FIG. 2, the main part 601 of the protective cover plate 6 may include a panel region D and two ¼ arc bent regions R1 located at two ends of the panel region D respectively. Each bent part 602 of the protective cover plate 6 includes a ¼ arc bent region R2, and the ¼ arc bent region R2 of each bent part 602 is connected with the ¼ arc bent region R1 of the main part 601 to form a 180° bend between the main part 601 and the bent part 602. In other words, the protective cover plate 6 is in a shape with the two ends bent by 180°, bent portions are semi-arc, the main part 601 and the bent parts 602 equally divide the bent portions of the semi-arc, and each have a ¼ arc bent region. Correspondingly, the first part 401 and the two second parts 402 of the fixing fixture 4 are the same as the main part 601 and the two bent parts 602 in setting.

When the operation of fixing the protective cover plate 6 is carried out, the two second parts 402 of the fixing fixture 4 may be detached and separated from the first part 401 firstly, and then the main part 601 of the protective cover plate 6 is in contact fit with the first part 401 of the fixing fixture 4; and then the two bent parts 602 of the protective cover plate 6 are covered with the two second parts 402 of the fixing fixture 4 respectively, and the two second parts 402 are fixedly mounted on the first part 401, thus fixing the protective cover plate 6 in the accommodating space of the fixing fixture 4 may be realized.

Figure 5:
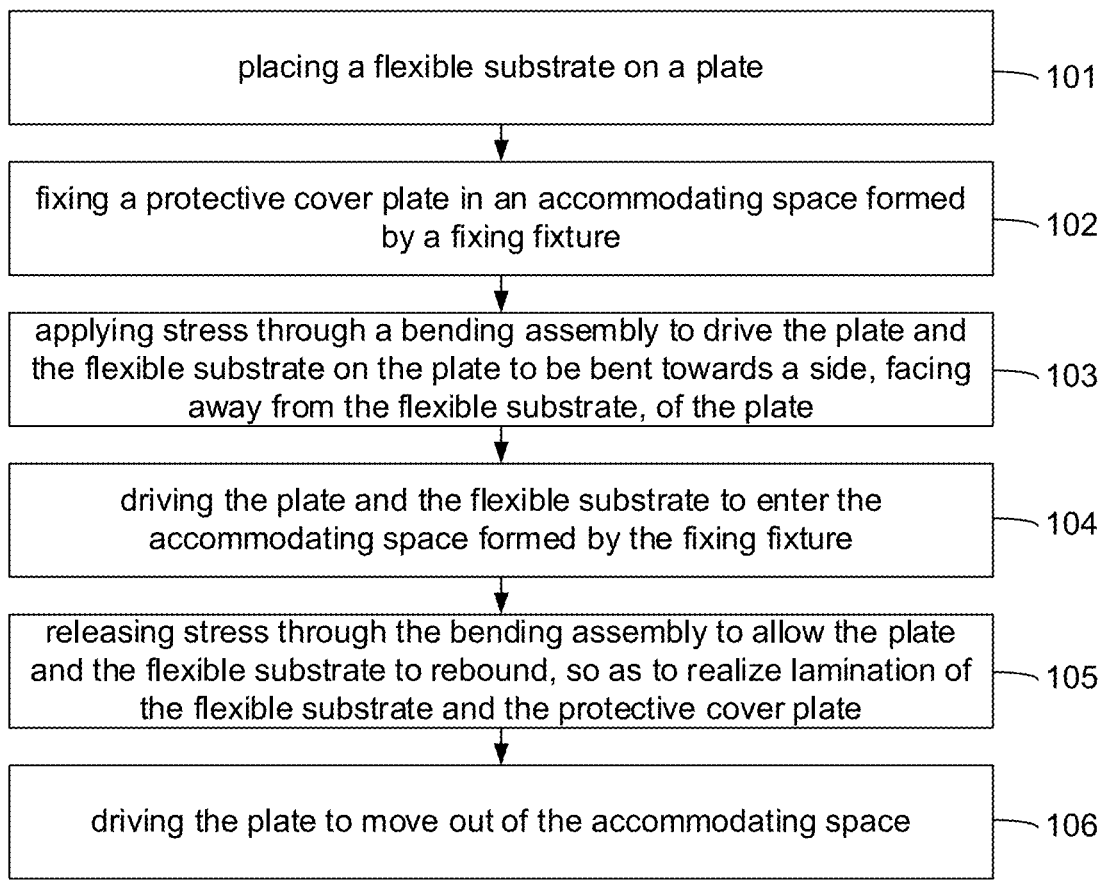
FIG. 5 is a flowchart of a laminating method of a display substrate provided by an embodiment of the present application.

In addition, embodiments of the present application further provide a laminating method of a display substrate. The laminating method adopts the laminating device according to any one of the above for laminating. As shown in FIG. 5, the laminating method includes the following operations.

In operation 101, as shown in FIG. 2, a flexible substrate 5 is placed on a plate 1.

In operation 102, as shown in FIG. 2, a protective cover plate 6 is fixed in an accommodating space formed by a fixing fixture 4.

In operation 103, as shown in FIG. 2, stress is applied through a bending assembly 3 to drive the plate 1 and the flexible substrate 5 located on the plate 1 to be bent towards a side, facing away from the flexible substrate 5, of the plate 1.

In operation 104, as shown in FIG. 3A and FIG. 3B, the plate 1 and the flexible substrate 5 are driven to enter the accommodating space formed by the fixing fixture 4.

In operation 105, as shown in FIG. 3C to FIG. 3E, stress is released through the bending assembly 3 to allow the plate 1 and the flexible substrate 5 to rebound, so as to realize lamination of the flexible substrate 5 and the protective cover plate 6.

In operation 106, as shown in FIG. 3G, the plate 1 is driven to move out of the accommodating space.

The execution sequence of operation 101 and operation 102 is not limited.

In some embodiments, the plate is configured to be magnetic; and the fixing fixture is configured to be magnetic and adjustable in magnetism.

After operation 105, namely after the stress is released through the bending assembly to allow the plate and the flexible substrate to rebound, so as to realize the lamination of the flexible substrate and the protective cover plate, the laminating method further includes:
  adjusting the magnetism of the fixing fixture to allow the fixing fixture and the plate to be magnetically attracted, so as to realize complete lamination of the flexible substrate and the protective cover plate.

In some embodiments, operation 103, that is, the stress is applied through the bending assembly to drive the plate and the flexible substrate located on the plate to be bent towards the side, facing away from the flexible substrate, of the plate may include:
  a shape of a bent outer side surface of the flexible substrate is coincident with that of a bent inner side surface of the protective cover plate, or a radian of the bent outer side surface of the flexible substrate is larger than a radian of the bent inner side surface of the protective cover plate.

In some embodiments, the bending assembly includes a bearing membrane and a drive component.

Operation 103, that is, the stress is applied through the bending assembly to drive the plate and the flexible substrate located on the plate to be bent towards the side, facing away from the flexible substrate, of the plate, includes:
  as shown in FIG. 2, the bearing membrane 31 is stretched through the drive component (for example, jigs 32 and roller shafts 33) to be bent, so as to drive the plate 1 and the flexible substrate 5 to be bent along with the bearing membrane 31.

Further, operation 105, that is, the stress is released through the bending assembly to allow the plate and the flexible substrate to rebound, so as to realize the lamination of the flexible substrate and the protective cover plate, includes:
  as shown in FIG. 3C to FIG. 3E, the drive component (for example, the jigs 32 and the roller shafts 33) gradually releases a pulling force to allow the plate 1 and the flexible substrate 5 to gradually rebound, so as to realize the lamination of the flexible substrate 5 and the protective cover plate 6.

In some embodiments, the bending assembly includes plate resilience assisting rods.

Operation 106, that is, the plate 1 is driven to move out of the accommodating space, includes:
  as shown in FIG. 3G, the plate 1 is driven to be bent through the plate resilience assisting rods 34 so as to pass through an opening of the accommodating space;
  and the plate 1 moves out of the accommodating space from the opening of the accommodating space.

In some embodiments, as shown in FIG. 2, the fixing fixture 4 includes a first part 401 and two second parts 402 located at two ends of the first part 401; and the first part 401 is respectively detachably connected with the two second parts 402.

Operation 102, that is, the protective cover plate is fixed in the accommodating space formed by the fixing fixture, includes: as shown in FIG. 2, the two second parts 402 of the fixing fixture 4 are detached and separated from the first part 401;
  the main part 601 of the protective cover plate 6 is in contact fit with the first part 401 of the fixing fixture 4; and
  the two bent parts 602 of the protective cover plate 6 are covered with the two second parts 402 of the fixing fixture 4 respectively, and the two second parts 402 are fixedly mounted on the first part 401.

Exemplarily, as shown in FIG. 2, taking a mode that the protective cover plate 6 is inverted with the two ends bent by 180° as an example, specific conditions of the laminating device in some embodiments are: the plate 1 and the fixing fixture 4 are configured to be magnetic, and the bending assembly 3 includes the bearing membrane 31, the drive component (including the jigs 32 and the roller shafts 33) and the plate resilience assisting rods 34. The operation process of the laminating method of the display substrate of the embodiments of the present application may include the following operations.

In operation 201, as shown in FIG. 2, the protective cover plate 6 is clamped in the accommodating space of the fixing fixture 4.

In operation 202, as shown in FIG. 2, the bearing membrane 31 is attached to the surface of the flexible substrate 5, and then the flexible substrate 5 is placed on the plate 1; and the jigs 32 of the drive component are stretched to drive the flexible substrate 5 and the plate 1 to be pre-bent through the bearing membrane 31.

In operation 203, as shown in FIG. 3A and FIG. 3B, the plate 1 and the flexible substrate 5 are driven through the supporting base platform 2 to enter the accommodating space formed by bending the fixing fixture 4, and the distance between optical clear adhesive (OCA) on the bent outer side surface of the flexible substrate 5 and the protective cover plate 6 is roughly 1 mm. For example, as shown in FIG. 4A, the plate 1 and the flexible substrate may enter the accommodating space from a lower opening of the fixing fixture 4, or, as shown in FIG. 4B, the plate 1 and the flexible substrate may enter the accommodating space of the fixing fixture 4 from a side opening. Further, as shown in FIG. 3B, after the plate 1 and the flexible substrate 5 are completely accommodated in the accommodating space of the fixing fixture 4, a non-bent region of the flexible substrate 5 and a non-bent region of the protective cover plate 6 may be pre-laminated by slowly moving the supporting base platform 2 upwards.

In operation 204, as shown in FIG. 3C to FIG. 3E, the drive component (including the jigs 32 and the roller shafts 33) is released, the flexible substrate 5 and the plate 1 recover by aid of the resilience force, and the flexible substrate 5 is laminated to the protective cover plate 6 gradually according to a sequence from the middle to two sides, thereby completing pre-lamination of bent areas.

In operation 205, as shown in FIG. 3F, the magnetism of the fixing fixture 4 is adjusted to produce a magnetic field to attract the plate 1, and an attraction pressure between the fixing fixture 4 and the plate 1 is kept for a period of time, thereby realizing complete lamination of the protective cover plate 6 and the flexible substrate 5.

In operation 206, as shown in FIG. 3G, the drive component (including the jigs 32 and the roller shafts 33) is released to be in a free state, the plate 1 is bent by stretching the plate resilience assisting rods 34, and the plate 1 is driven through the supporting base platform 2 to move out of the accommodating space of the fixing fixture 4, thereby completing the whole laminating process.

As shown in FIG. 3G, after the laminating process is completed, the bearing membrane 31 may be torn off the flexible substrate 5.

It should be noted that in some embodiments of the present disclosure, the laminating method of the display substrate may further include more operations, which may be determined according to actual needs, and the embodiments of the present disclosure do not limit this. For the detailed description and technical effects, please refer to the description of the laminating device, the protective cover plate and the flexible substrate above, which will not be repeated here. In addition, in the laminating method of the display substrate provided by the embodiments of the present disclosure, the embodiments of some operations are not limited to the above-described specific operation methods, and other operation methods may also be used. For details, please refer to the description of the laminating device of the embodiments, which will not be repeated here.

Embodiments of the present application further provide a display panel. The display panel includes a protective cover plate and a flexible substrate, and the protective cover plate and the flexible substrate are prepared by adopting the laminating method according to any one of above.

Exemplarily, the display panel may be an OLED display panel, the flexible substrate is a drive backplane, and the protective cover plate is a glass cover plate. The display panel may be applied to various electronic display apparatuses such as a displayer, a smart phone and a tablet computer.

It will be apparent to those skilled in the art that various modifications and variations can be made in the embodiments of the present invention without departing from the spirit or scope of the invention. Thus, it is intended that the present application covers the modifications and variations of this application provided they come within the scope of the appended claims and their equivalents.

What is claimed is:

1. A laminating device, comprising:
   a plate, which is bendable, has a resilience characteristic, and is configured for bearing a flexible substrate;
   a supporting base platform, for supporting the plate and driving the plate and the flexible substrate on the plate to move;
   a bending assembly, for applying stress so as to drive the plate and the flexible substrate on the plate to be bent towards a side of the plate facing away from the flexible substrate, and for releasing stress so as to allow the plate and the flexible substrate to rebound; and
   a fixing fixture, for fixing a protective cover plate, wherein the protective cover plate is for being laminated to the flexible substrate; a shape of the fixing fixture is same as or similar to a shape of the protective cover plate; the fixing fixture is bent to form an accommodating space; and the protective cover plate is fixed in the accommodating space;
   wherein the bending assembly comprises:
   a bearing membrane, configured to be laminated on a surface of a side of the flexible substrate facing the plate, to be disposed on the plate together with the flexible substrate and to drive the flexible substrate and the plate to be bent; and
   a drive component, configured to be used in cooperation with the bearing membrane, and to drive the bearing membrane to be bent by stretching the bearing membrane.

2. The laminating device according to claim 1, wherein the bearing membrane comprises a stretching part exceeding an edge of the flexible substrate; and
   the drive component comprises a jig and a roller shaft, the jig is used to clamp an edge of the stretching part and apply a pulling force to the stretching part, and the roller shaft is used to support the stretching part and change a direction of the pulling force of the stretching part.

3. The laminating device according to claim 2, wherein the bending assembly further comprises:
   a plate resilience assisting rod, connected with an edge of the plate, and configured to apply stress so as to drive the plate to be bent and release stress so as to allow the plate to rebound.

4. The laminating device according to claim 1, wherein the plate comprises a stainless steel layer and a buffer layer, and a surface of the buffer layer is configured as a bearing surface.

5. The laminating device according to claim 4, wherein the stainless steel layer has a tensile strength of more than 1500 MPa, a hardness of more than 530 HV, and a thickness of 0.1 mm-0.2 mm.

6. The laminating device according to claim 4, wherein the buffer layer is a silica gel material layer, and has a hardness of 20-60 Shore A.

7. The laminating device according to claim 6, wherein the stainless steel layer and the buffer layer are compounded and integrated through a silica gel injection molding process; and the supporting base platform is a rigid base platform and welded to the stainless steel layer.

8. The laminating device according to claim 1, wherein the plate is configured to be magnetic; and
   the fixing fixture is configured to be magnetic and adjustable in magnetism.

9. The laminating device according to claim 8, wherein the fixing fixture comprises a base material and a magnetic layer disposed in the base material; and the magnetic layer is configured to be adjustable in magnetism through an electric signal.

10. The laminating device according to claim 1, wherein the protective cover plate comprises a main part and two bent parts at two ends of the main part;
    the fixing fixture comprises a first part and two second parts at two ends of the first part; a shape of the first part is same as or similar to a shape of the main part of the protective cover plate, and shapes of the two second parts are same as or similar to shapes of the two bent parts of the protective cover plate respectively; and the first part is respectively detachably connected with the two second parts.

11. The laminating device according to claim 10, wherein the main part comprises a panel region and two ¼ arc bent regions at two ends of the panel region respectively; and each bent part comprises a ¼ arc bent region, and the ¼ arc bent region of each bent part is connected with a respective one of the two ¼ arc bent regions of the main part to form a 180° bend between the main part and the bent part.

12. A laminating method of a display substrate, adopting the laminating device according to claim 1 for laminating, and comprising:
  placing the flexible substrate on the plate;
  fixing the protective cover plate in the accommodating space formed by the fixing fixture;
  applying stress through the bending assembly to drive the plate and the flexible substrate on the plate to be bent towards the side of the plate facing away from the flexible substrate;
  driving the plate and the flexible substrate to enter the accommodating space formed by the fixing fixture;
  releasing stress through the bending assembly to allow the plate and the flexible substrate to rebound, so as to realize lamination of the flexible substrate and the protective cover plate; and
  driving the plate to move out of the accommodating space.

13. The laminating method according to claim 12, wherein the plate is configured to be magnetic; the fixing fixture is configured to be magnetic and adjustable in magnetism; and
  after the stress is released through the bending assembly to allow the plate and the flexible substrate to rebound, so as to realize the lamination of the flexible substrate and the protective cover plate, the method further comprises:
  adjusting the magnetism of the fixing fixture to allow the fixing fixture and the plate to be magnetically attracted, so as to realize complete lamination of the flexible substrate and the protective cover plate.

14. The laminating method according to claim 12, wherein:
  a shape of a bent outer side surface of the flexible substrate is coincident with a shape of a bent inner side surface of the protective cover plate, or
  a bending curvature diameter of the bent outer side surface of the flexible substrate is smaller than a bending curvature diameter of the bent inner side surface of the protective cover plate.

15. The laminating method according to claim 12, wherein
  said applying the stress through the bending assembly to drive the plate and the flexible substrate on the plate to be bent towards the side of the plate facing away from the flexible substrate, comprises:
    stretching the bearing membrane through the drive component to bend the bearing membrane, so as to drive the plate and the flexible substrate to be bent along with the bearing membrane.

16. The laminating method according to claim 15, wherein the bending assembly comprises a plate resilience assisting rod; and
  said driving the plate to move out of the accommodating space comprises:
    driving the plate, through the plate resilience assisting rod, to be bent and to pass through an opening of the accommodating space; and
    driving the plate to move out of the accommodating space from the opening of the accommodating space.

17. The laminating method according to claim 12, wherein the fixing fixture comprises a first part and two second parts at two ends of the first part; the first part is respectively detachably connected with the two second parts; and
  said fixing the protective cover plate in the accommodating space formed by the fixing fixture comprises:
    detaching and separating the two second parts of the fixing fixture from the first part;
    matching a main part of the protective cover plate and the first part of the fixing fixture in a contact mode; and
    covering two bent parts of the protective cover plate with the two second parts of the fixing fixture respectively, and fixedly mounting the two second parts on the first part.

18. The laminating method according to claim 15, wherein said releasing the stress through the bending assembly to allow the plate and the flexible substrate to rebound, so as to realize the lamination of the flexible substrate and the protective cover plate comprises:
  gradually releasing a pulling force through the drive component to allow the plate and the flexible substrate to rebound gradually, so as to realize the lamination of the flexible substrate and the protective cover plate.

19. A laminating device, comprising:
  a plate, which is bendable, has a resilience characteristic, and is configured for bearing a flexible substrate;
  a supporting base platform, for supporting the plate and driving the plate and the flexible substrate on the plate to move;
  a bending assembly, for applying stress so as to drive the plate and the flexible substrate on the plate to be bent towards a side of the plate facing away from the flexible substrate, and for releasing stress so as to allow the plate and the flexible substrate to rebound; and
  a fixing fixture, for fixing a protective cover plate, wherein the protective cover plate is for being laminated to the flexible substrate; a shape of the fixing fixture is same as or similar to a shape of the protective cover plate; the fixing fixture is bent to form an accommodating space;
  and the protective cover plate is fixed in the accommodating space;
  wherein the plate is configured to be magnetic; and
  the fixing fixture is configured to be magnetic and adjustable in magnetism.

20. A laminating device, comprising:
  a plate, which is bendable, has a resilience characteristic, and is configured for bearing a flexible substrate;
  a supporting base platform, for supporting the plate and driving the plate and the flexible substrate on the plate to move;
  a bending assembly, for applying stress so as to drive the plate and the flexible substrate on the plate to be bent towards a side of the plate facing away from the flexible substrate, and for releasing stress so as to allow the plate and the flexible substrate to rebound; and
  a fixing fixture, for fixing a protective cover plate, wherein the protective cover plate is for being laminated to the flexible substrate; a shape of the fixing fixture is same as or similar to a shape of the protective cover plate; the fixing fixture is bent to form an accommodating space; and the protective cover plate is fixed in the accommodating space;
  wherein the protective cover plate comprises a main part and two bent parts at two ends of the main part;
  the fixing fixture comprises a first part and two second parts at two ends of the first part; a shape of the first part is same as or similar to a shape of the main part of the protective cover plate, and shapes of the two second parts are same as or similar to shapes of the two bent parts of the protective cover plate respectively; and the first part is respectively detachably connected with the two second parts.

\* \* \* \* \*